US009552295B2

(12) United States Patent
Solihin (10) Patent No.: US 9,552,295 B2
(45) Date of Patent: Jan. 24, 2017

(54) PERFORMANCE AND ENERGY EFFICIENCY WHILE USING LARGE PAGES

(71) Applicant: Empire Technology Development LLC, Wilmington, DE (US)

(72) Inventor: Yan Solihin, Raleigh, NC (US)

(73) Assignee: Empire Technology Development LLC, Wilmington, DE (US)

( * ) Notice: Subject to any disclaimer, the term of this patent is extended or adjusted under 35 U.S.C. 154(b) by 559 days.

(21) Appl. No.: 13/880,194

(22) PCT Filed: Sep. 25, 2012

(86) PCT No.: PCT/US2012/057058
§ 371 (c)(1),
(2) Date: Apr. 18, 2013

(87) PCT Pub. No.: WO2014/051544
PCT Pub. Date: Apr. 3, 2014

(65) Prior Publication Data
US 2014/0149674 A1    May 29, 2014

(51) Int. Cl.
*G06F 12/00* (2006.01)
*G06F 12/08* (2016.01)
*G06F 12/12* (2016.01)
*G06F 12/02* (2006.01)

(52) U.S. Cl.
CPC ......... *G06F 12/0826* (2013.01); *G06F 12/023* (2013.01); *G06F 12/08* (2013.01); *G06F 12/12* (2013.01); *G06F 12/121* (2013.01); *Y02B 60/1225* (2013.01)

(58) Field of Classification Search
USPC ........................................................ 711/133
See application file for complete search history.

(56) References Cited

U.S. PATENT DOCUMENTS

| 6,182,089 B1 | 1/2001 | Ganapathy et al. |
| 6,308,247 B1 | 10/2001 | Ackerman et al. |
| 6,334,172 B1 | 12/2001 | Arimilli et al. |
| 7,197,516 B1 | 3/2007 | Hipp et al. |
| 7,296,139 B1 * | 11/2007 | Case et al. ................... 711/209 |
| 7,310,712 B1 | 12/2007 | Gordon |
| 7,650,482 B2 | 1/2010 | Traut et al. |
| 7,680,996 B2 | 3/2010 | Komarov et al. |

(Continued)

OTHER PUBLICATIONS

Borkar, S. and Chien, A.A., et al., "The Future of Microprocessors," Communications of the ACM, vol. 54, Issue 5, pp. 67-77 (May 2011).
International Search Report & Written Opinion for International Application No. PCT/US2012/043995 issued on Oct. 5, 2012.

(Continued)

*Primary Examiner* — Jared Rutz
*Assistant Examiner* — Hamdy S Ahmed
(74) *Attorney, Agent, or Firm* — Turk IP Law, LLC (57) ABSTRACT

Technologies are described herein for improving performance and energy efficiency in a computing system while using a large memory page size. Some example technologies may configure a main memory of the computing system to include a page-to-chunk table and a data area. The page-to-chunk table may include multiple entries such as a first entry. The first entry may correspond to a page that is made up of multiple chunks. The first entry may include pointers to the multiple chunks stored in the data area.

33 Claims, 6 Drawing Sheets

(56) References Cited

U.S. PATENT DOCUMENTS

| | | |
|---|---|---|
| 2002/0103968 A1 | 8/2002 | Grover |
| 2004/0093474 A1 | 5/2004 | Lin et al. |
| 2005/0015378 A1 | 1/2005 | Gammel et al. |
| 2005/0027819 A1 | 2/2005 | Nakano et al. |
| 2005/0223321 A1 | 10/2005 | Mather et al. |
| 2006/0047926 A1 | 3/2006 | Zheng |
| 2006/0235909 A1 | 10/2006 | Oks et al. |
| 2007/0136506 A1 | 6/2007 | Traut et al. |
| 2008/0235467 A1 | 9/2008 | Tagawa |
| 2008/0270739 A1 | 10/2008 | Hamilton et al. |
| 2009/0089518 A1* | 4/2009 | Hobbet ................. G06F 3/0608 711/155 |
| 2009/0248984 A1 | 10/2009 | Shen et al. |
| 2010/0191757 A1 | 7/2010 | Noguchi et al. |
| 2011/0119234 A1 | 5/2011 | Schack et al. |
| 2011/0231593 A1 | 9/2011 | Yasufuku et al. |
| 2011/0238937 A1 | 9/2011 | Murotani et al. |
| 2011/0289263 A1 | 11/2011 | McWilliams et al. |
| 2012/0233438 A1* | 9/2012 | Bak et al. .................... 711/206 |
| 2013/0227248 A1 | 8/2013 | Mehta et al. |

OTHER PUBLICATIONS

Jiang, X., et al. "Architecture Support for Improving Bulk Memory Copying and Initialization Performance," 18th International Conference on Parallel Architectures and Compilation Techniques, pp. 169-180 (Sep. 12, 2009-Sep. 16, 2009).

Randell, B., "Hardware/software tradeoffs: A General Design Principle?," ACM SIGARCH Computer Architecture News, pp. 2 (Jan. 25, 1985).

Warfield, A., et al. "Parallax: Managing storage for a million machines," Proceedings of the 10th Workshop on Hot Topics in Operating Systems, vol. 10, pp. 6 (2005).

Zhao L., et al., "Hardware support for accelerating data movement in server platform," IEEE Transactions on Computers, vol. 56, Issue 6, pp. 740-753 (Jun. 2007).

International Search Report and Written Opinion for PCT Application No. PCT/US2012/057058 mailed Feb. 1, 2013.

Bhargava, R. et al., "Accelerating Two-Dimensional Page Walks for Virtualized Systems," ASPLOS '08; Mar. 1-5, 2008; pp. 26-35.

Final Office Action received for U.S. Appl. No. 13/813,591, mailed May 21, 2015 and filed on Jan. 31, 2013.

* cited by examiner

PERFORMANCE AND ENERGY EFFICIENCY WHILE USING LARGE PAGES

CROSS-REFERENCE TO RELATED APPLICATION

This Application is the U.S. National Stage filing under 35 U.S.C. §371 of International Application No, PCT/US12/57058 filed on Sep. 25, 2012. The International Application is herein incorporated by reference in its entirety.

BACKGROUND

Unless otherwise indicated herein, the materials described in this section are not prior art to the claims in this application and are not admitted to be prior art by inclusion in this section.

An operating system ("OS") may manage the address space of an application at the granularity of pages. In conventional systems, the OS may be configured to use a smaller page size (typically 4 KB) by default even when a corresponding hardware platform supports a larger page size. A smaller page size may be selected because a larger page size may increase fragmentation of the main memory. A smaller page size may be selected also because common OS routines, such as page initialization or page copying, may become too expensive with a large page size.

SUMMARY

The present disclosure generally describes some example memory configurations for improving performance and energy efficiency in a computing system while using a large memory page size. Example memory configurations may include a page-to-chunk table and a data area. The page-to-chunk table may include multiple entries such as a first entry. The first entry may correspond to a page that is made up of multiple chunks. The first entry may include pointers to the multiple chunks stored in the data area.

The present disclosure generally further describes some example methods for handling large pages in a memory. The memory may include a page-to-chunk table and a data area. The page-to-chunk table may include multiple entries such as a first entry that corresponds to a page. The page may be made up of multiple chunks stored in the data area including a first chunk. The first entry may include a first status identifier for the first chunk and a first pointer. Example methods may set the first status identifier for the first chunk to an unallocated state. The unallocated state may indicate that the page is unallocated. Example methods may receive a request for page allocation with no clearing of data in the page. Example methods may transition the first status identifier from the unallocated state to an unreserved and uninitialized state, responsive to receiving the request for page allocation with no clearing of the data in the page. The first chunk may be unreserved in the data area when the first status identifier is in the unreserved and uninitialized state.

The present disclosure generally further describes some example multicore chips. Example multicore chips may include multiple processor cores, a main memory, and a chunk controller. The processor cores may include multiple cache memories. The main memory may include a page-to-chunk table and a data area. The page-to-chunk table may include multiple entries including a first entry. The first entry may correspond to a page that is made up of multiple chunks. The first entry may include pointers to the multiple chunks stored in the data area. The chunk controller may be configured (a) to receive requests from the processor cores to access the page in the main memory and (b) to manage translation of the page to the multiple chunks using the page-to-chunk table in response to the requests.

The foregoing Summary is illustrative only and is not intended to be in any way limiting. In addition to the illustrative aspects, embodiments, and features described above, further aspects, embodiments, and features will become apparent by reference to the Figures and the following Detailed Description.

BRIEF DESCRIPTION OF THE FIGURES

The foregoing and other features of this disclosure will become more fully apparent from the following Detailed Description, accompanying Figures, and appended claims. Understanding that these Figures depict only several embodiments in accordance with the disclosure and are, therefore, not to be considered limiting of its scope, the disclosure will be described with additional specificity and detail with reference to the accompanying Figures, in which:

DETAILED DESCRIPTION

In the present Detailed Description, reference is made to the accompanying Figures, which form a part hereof. In the Figures, similar symbols typically identify similar components, unless context dictates otherwise. The illustrative embodiments described in the Detailed Description and Figures are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Data centers may utilize multicore chips to run their computer systems or servers. A major resource and power consumption source for these multicore chips is their use of small page size in the management of main memory. An OS may manage the address space of an application at the granularity of pages, by using a structure called a "page table" to map each page in the application address space to a page in the physical memory. A typical page size may be 4 KB, with some hardware platforms providing an option for larger pages, on the order of a few megabytes or more. In many current systems, however, the OS may choose a smaller page size, such as the 4 KB page size, by default even when larger pages are supported.

There may be several trade-offs between a small page size versus a large page size. The size of the page table may be inversely proportional to the page size. As a result, a large page size may be beneficial from a resource utilization standpoint. For example, a page table with a 4 MB page size is $\frac{1}{1024}$ the size of a page table with 4 KB page size (i.e., 4 MB/4 KB=1024). In addition, the performance of translation lookaside buffers ("TLBs") may benefit from increased page size, because the TLB can cover a much larger memory space when large pages are used. For example, on a typical microprocessor used in a data center, a level-1 ("L1") TLB typically may have 16 entries, while a level-2 ("L2") TLB may have 512 entries. When the 4 KB page size is used, the L1 and L2 TLBs can cover 64 KB (i.e., 4 KB×16) and 2 MB (i.e., 4 KB×512) of total memory space, respectively. In contrast, when a 4 MB page sized is used, the same L1 and L2 TLBs can cover 64 MB (i.e., 4 MB×16) and 2 GB (i.e., 4 MB×512), respectively. Hence, TLB misses in the processor can be much less frequent with a larger page size.

In addition, excessive energy may be expended on address translation of small page tables. A page table may be organized as a radix tree with multiple levels. The larger the page table (i.e., the smaller the page size), the more levels in the radix tree. On a TLB miss, this tree may be traversed one level at a time in a process commonly referred to as "page table walking". In addition, accessing each level of the page table may potentially incur a memory access. While additional structures may be implemented to accelerate or skip steps in the page table walk and avoid frequent memory accesses, these structures may be suboptimal and misses may still occur frequently, consuming significant power. In a computer system that uses virtualization support for servers, for example, the number of levels to traverse on a page walk may increase roughly quadratically due to the use of nested page tables. This may further degrade performance and increase power consumption.

Utilizing a large page size, however, can also introduce its own challenges. For example, the amount of fragmentation of the main memory may increase. In some OSs, a shared library may be allocated its own page in memory. A large application executing in the OS may use a few hundred shared libraries. With a small 4 KB page, five hundred shared libraries may produce an average fragmentation of 1 MB (i.e., (4 KB/2)×500). However, when a 4 MB page is utilized, the average fragmentation may rise to 1 GB (i.e., (4 MB/2)×500). Such fragmentation may be considered an unmanageably high level considering that the total physical memory in some current systems is in the range of GBs. Additionally, common OS routines, such as page initialization or page copying, may incur too much latency with a large page size. This may affect the latency of process forking, establishing shared memory between processes, or other processes affected by larger page sizes by multiple orders of magnitude.

This disclosure is generally drawn, inter alia, to technologies for improving performance and energy efficiency in a computing system while using a large memory page size. Various technologies may be configured to implement of a large page size for the management of memory. Such technologies may provide the benefits of a large page size, such as increased TLB coverage and smaller page tables, while also mitigating or avoiding the performance degradation caused by a large page size. For example, through the various technologies described herein, an OS may be configured to utilize a large page size for the management of memory without the large increase in fragmentation of the memory or without incurring a large overhead for system calls (e.g., "fork", "mmap", etc.) that rely on page initialization or copying.

Figure 1:
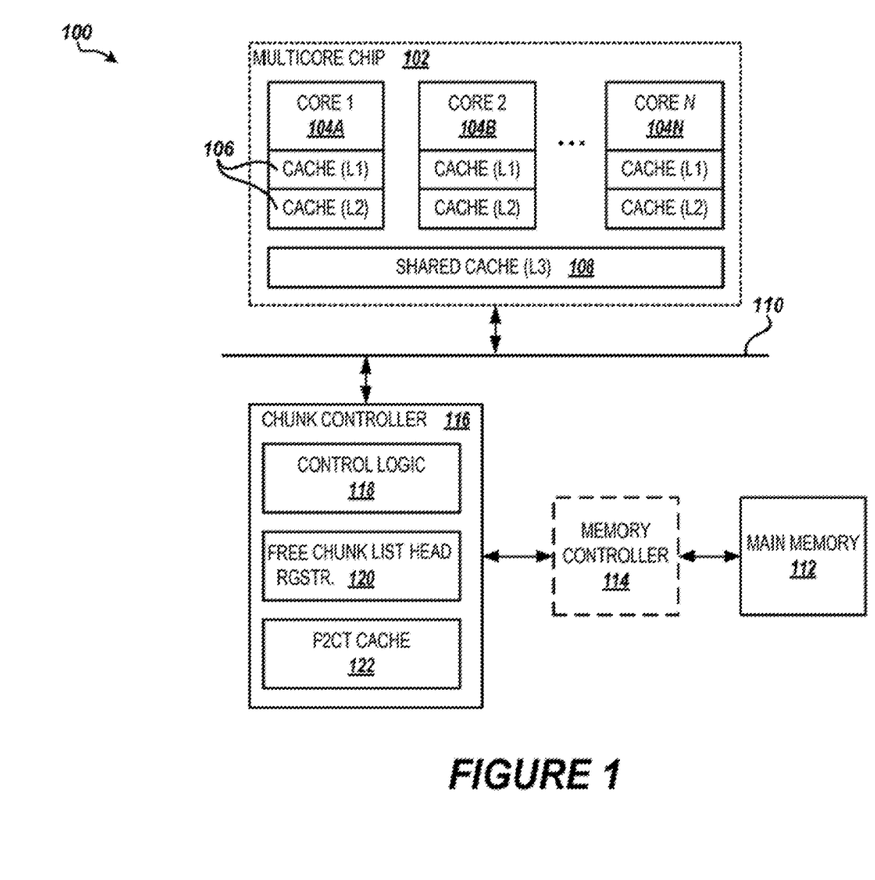
FIG. 1 is a functional block diagram showing an illustrative operating environment of an example computing system.

FIG. 1 is a functional block diagram showing an illustrative operating environment 100 of an example computing system, arranged according to at least some embodiments presented herein. The operating environment 100 may include a multicore chip 102. The multicore chip 102 may include a plurality of processor cores 104A-104N (also referred to herein generally as processor core 104 or processor cores 104). Each processor core 104 may also include one or more cache memories 106, organized in a multi-level configuration. The multicore chip 102 may further contain one or more shared caches, such as shared cache 108, that are shared between two or more of the processor cores 104.

It will be appreciated that any number and levels of cache memories 106 or shared caches 108 may be implemented per processor core 104 or across processor cores in the computing system, and that the cache memories or shared caches may be implemented on the multicore chip 102 or provided by additional components in the computing system coupled to the multicore chip by an interconnecting bus or network, such as a bus 110 shown in FIG. 1. In addition, there may be multiple multicore chips 102 in the computing system coupled to the bus 110. It will be further appreciated that, while the embodiments and examples herein are described in the context of the multicore chip 102 shown in FIG. 1, the technologies described herein may be equally applicable to computing systems having one or more single-core processors or a combination of single-core and multi-core processors.

The processor cores 104 of the multicore chip 102 may be configured to access a main memory 112 of the computing system through a memory controller 114. The main memory 112 of the computing system (also referred to herein as random access memory or "RAM") may be integrated into the multicore chip 102 (not shown in FIG. 1), or may be implemented as an additional component in the computing system coupled to the multicore chip through the bus 110. The main memory 112 may be implemented in any number of technologies, including static RAM ("SRAM"), dynamic RAM, such as synchronous dynamic RAM ("SDRAM"), electrically erasable programmable read-only memory ("EEPROM") such as flash memory, or other memory technologies. Additional technologies may include nonvolatile RAM ("nvRAM"), ferroelectric RAM ("FeRAM"), magnetoresistive RAM ("MRAM"), phase-change RAM ("PRAM"), conductive-bridging RAM ("CBRAM"). Silicon-Oxide-Nitride-Oxide-Silicon ("SONOS"), resistive RAM ("RRAM"), racetrack memory, nano-RAM ("NRAM"), or millipede memory.

The processor cores 104, an operating system ("OS"), or virtual machine manager ("VMM") executing in the computing system may be configured allocate, initialize, or otherwise manage the memory space of the main memory 112 in specific-sized portions, referred to herein as "pages." The size of the pages of memory, or "page size," may be a configurable parameter of the multicore chip 102 or the computing system as set by the OS or VMM. For example the page size in the computing system may default to 4 KB, but may be configurable by the OS to larger values, such as 4 MB. In some examples described herein, a "small" page may generally refer to a page size on the order of several KBs, and a "large" page may generally refer to a page size on the order of several MBs or larger. In addition, the OS or VMM may map pages of virtual memory in an application address space for one or more applications executing in the computing system to physical pages in the main memory 112, as described above.

According to various embodiments, the operating environment 100 may further include a chunk controller 116. As will be described in more detail herein, the chunk controller 116 may be configured to receive requests to allocate, initialize, or free pages of the main memory 112 from the OS or VMM, as well as requests to read or write data from or to the main memory 112 from the processor cores 104. The chunk controller 116 may provide an additional layer of address translation between the physical page addresses requested by the OS, VMM, or processor cores and an actual organization of the main memory 112 into units of a fixed size, referred to herein as "chunks." The chunk controller 116 may be effectively arranged between or alongside the processor cores 104 and the main memory 112 of the computing system. For example, the chunk controller 116 may be integrated on the multicore chip 102 or coupled to the processor cores 104 via the bus 110, and may be further coupled to the main memory 112 through the memory controller 114, as shown in FIG. 1. In some other embodiments, the chunk controller 116 and the memory controller 114 may be implemented as one component, either integrated on the multicore chip 102 or coupled to the processor cores 104 via the bus 110.

The chunk controller 116 may include control logic 118. The control logic 118 may be configured to manage the configuration of the main memory 112, process requests from the processor cores 104, or the address translation. The control logic 118 may be implemented as software, hardware, firmware, or any combination thereof. For example, the control logic 118 may be embodied in the circuitry of the multicore chip 102 or other component in the computing system. The chunk controller 116 may further include a free chunk list head register 120. The free chunk list head register 120 may be a dedicated register, for example, on the chunk controller 116 and configured to maintain a list of free chunks in the main memory 112, as will be described in more detail below with reference to FIG. 4. The chunk controller 116 may further include a page-to-chunk table (P2CT) cache 122 which may further be utilized to improve performance in the system, as will also be described in more detail below.

Figure 2:
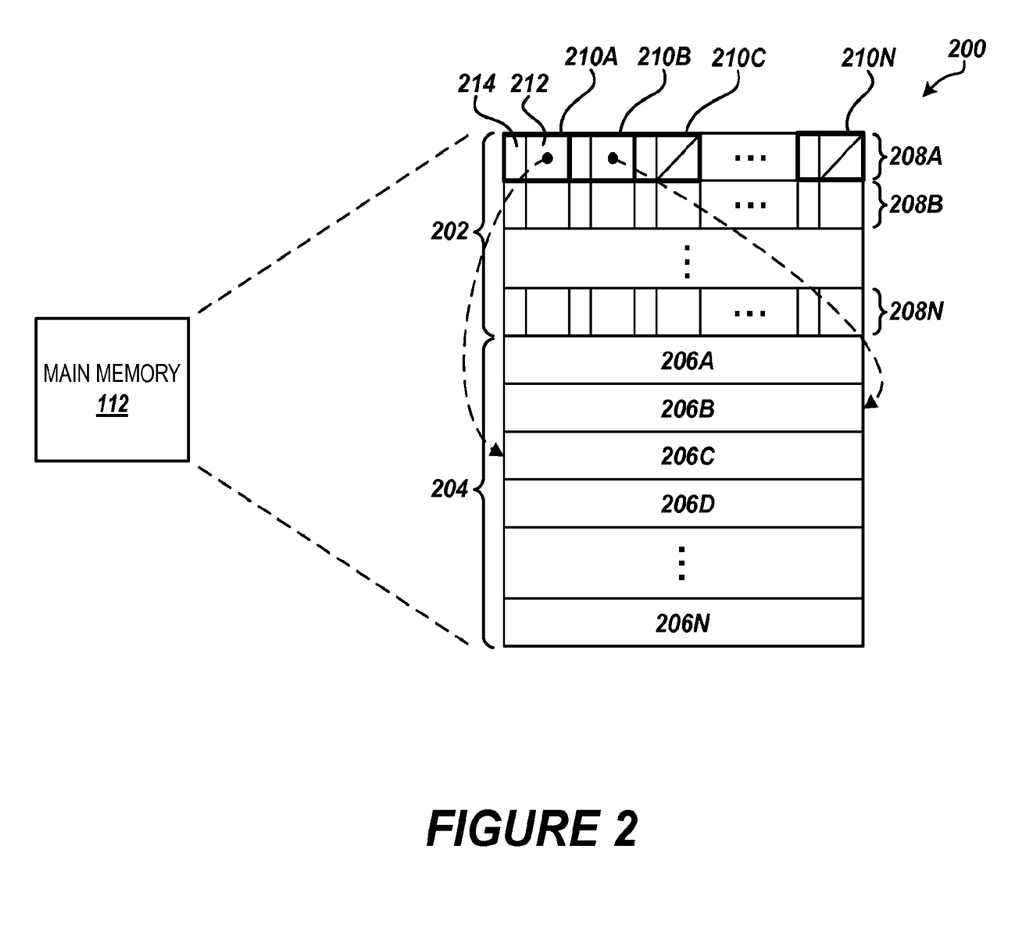
FIG. 2 is a functional block diagram showing an illustrative configuration of a main memory as implemented and utilized by a chunk controller.

FIG. 2 is a functional block diagram showing an illustrative configuration 200 of the main memory 112 as implemented and utilized by the chunk controller 116, arranged according to at least some embodiments presented herein. As described above with reference to FIG. 1, the computing system may be configured to utilize a uniformly large page size, while the main memory 112 may be organized into smaller fixed units of size, or "chunks." This may allow the computing system to realize the benefits of a large page size without suffering from the drawbacks traditionally associated with large pages. For example, the page size for pages of memory may be set by the OS or VMM executing in the computing system to be 1 MB, 4 MB, or 16 MB, while the main memory 112 may be organized into chunks of 4 KB.

As shown in FIG. 2, the main memory 112 may be divided into a P2CT 202 and a data area 204. The P2CT 202 may be hidden from the OS, VMM, or applications executing in the computing system. The P2CT 202 may contain data utilized by the chunk controller to organize the data area 204 and provide address translation of page requests received from the processor cores 104. The data area 204 may be visible to the OS, VMM, or applications. The data area 204 may be organized into a number of chunks 206A-206N (also referred to herein generally as chunk 206 or chunks 206) of a uniform size or a differing size, depending on the need. For example, each chunk 206 may be 4 KB in size. Utilizing a 4 KB chunk size may increase efficiency of access of the chunks 206 by the chunk controller 116 through the memory controller 114, for example.

The P2CT 202 may include a number of entries 208A-208N (also referred to herein generally as entry 208 or entries 208). Each entry 208 may correspond to a physical page of memory as presented to the OS, VMM, or processor cores 104 of the computing system. In some embodiments, the P2CT 202 may be configured to include as many entries 208 as the number of pages that would fit in the data area 204 of the main memory 112 based on the selected page size. However, as will be described in more detail below, the chunk controller 116 may be configured to represent that more pages (and thus more memory) exist than would actually fit in the main memory 112, based on a utilization of the chunks 206 corresponding to the pages as determined from the P2CT 202.

Each entry 208 in the P2CT 202 may include multiple pairs of values, such as pairs 210A-210N (also referred to herein generally as pair 210 or pairs 210) comprising entry 208A as shown in FIG. 2. According to some embodiments, the selected page size can be a multiple of the chunk size, and thus each page of memory may include a fixed number of chunks 206, with each chunk tracked independently in the P2CT 202. Each entry 208 may contain the same number of pairs 210 as the number of chunks 206 that may fit in a physical page of memory, based on the selected page size and chunk size.

Each of the pairs of values 210 may include a chunk pointer 212 that contains a pointer to a particular chunk 206 in the data area 204. For example, the chunk pointer 212 may contain an address of the particular chunk 206 in the data area 204. Each of the pairs 210 may further include a status identifier 214 that is utilized by the chunk controller 116 to track the status of the chunk 206 pointed to by the corresponding chunk pointer 212 in the data area 204. For example, as shown in FIG. 2, the first entry 208A in the P2CT 202 is associated with two chunks 206 in the data area 204. The chuck pointer 212 in pair 210A points to chunk 206C, while the chunk pointer in pair 210B points to chunk 206B. Moreover, the status of these chunks 206 with respect to the corresponding page of memory are maintained in the status identifier 214 of the corresponding pair 210 by the chunk controller 116. The remaining pairs 210C-210N of the first entry 208A in the P2CT 202 may have null or invalid chunk pointers 212, but still contain valid status identifiers 214.

By utilizing the status identifier 214 of each of the pairs 210 in an entry 208 corresponding to a page of memory, the chunk controller 116 may be configured to indicate whether a chunk 206 is reserved in the data area 204 or not, as well and whether the chunk should have zero content, i.e. has been cleared or "initialized." In this way, fragmented pages of memory may only have a few actual chunks 206 reserved in the data area 204, with the remainder of the pairs 210 in the corresponding entry 208 marked as "unreserved." Because these unreserved areas of the fragmented page of memory may seldom be accessed by the processor cores 104, no space in the data area 204 need be allocated to the unreserved areas. Thus, actual fragmentation of the main memory 112 can be reduced. In addition, if an entire page of memory is initialized, e.g. zeroes are written to its contents, no chunks 206 need be allocated from the data area 204 and no writes need to take place. Instead, the status identifier 214 for each pair 210 in the corresponding entry 208 may be marked to indicate that the corresponding chunks 206 are "zero chunks," thus improving the performance of allocation and initialization of memory pages and reading from initialized pages.

Figure 3:
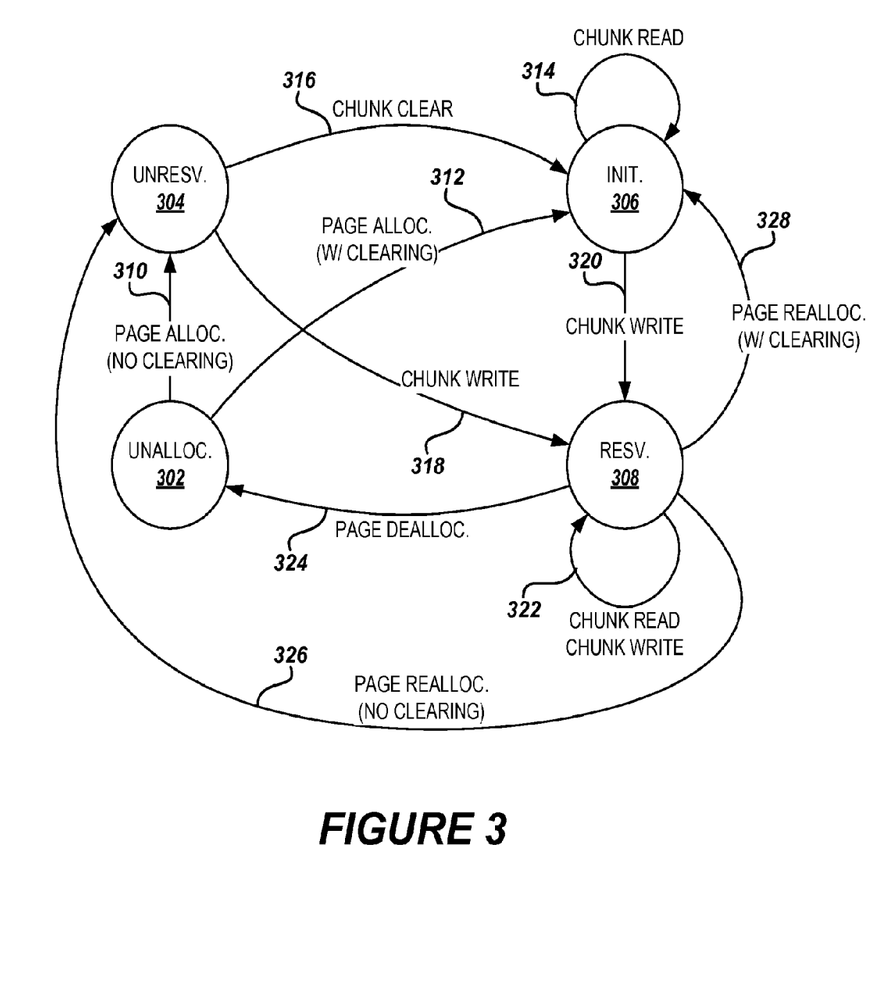
FIG. 3 is a state diagram showing an example method for maintaining the status identifier regarding a chunk of memory.

FIG. 3 is a state diagram showing an example method for maintaining the status identifier 214 regarding a chunk 206 of memory, arranged according to at least some embodiments presented herein. The state diagram may provide further details of the management of the status identifiers 214 in each entry 208 in the P2CT 202 by the chunk controller 116, according to some embodiments.

In some embodiments, the status identifiers 214 in the P2CT 202 may indicate one of an unallocated state 302, an unreserved and uninitialized state 304, an unreserved and initialized state 306, and a reserved state 308, as shown in FIG. 3. When the computing system initially boots, most of the main memory 112 will be empty and unallocated. Accordingly, most status identifiers 214 in the P2CT 202 will have an unallocated state 302 and most of the chunks 206 in the data area 204 will be unreserved. If a request to allocate a physical page of memory in the main memory 112 is received by the chunk controller 116 from the OS or VMM, for example, the chunk controller 116 may be configured to change the status identifiers 214 of the pairs 210 in the entry 208 in the P2CT 202 corresponding to the page of memory to indicate an allocated status.

For example, if the page of memory is allocated without clearing, as shown at 310 in FIG. 3, the chunk controller 116 may be configured to change the corresponding status identifiers 214 the P2CT 202 to reflect the unreserved and uninitialized state 304. If the page is allocated and cleared by writing zeros to all bytes in the page, as shown at 312, the chunk controller 116 may be configured to change the status identifiers 214 in the P2CT 202 to reflect the unreserved and initialized state 306. Note that no free chunks 206 in the data area 204 need be reserved for the page of memory and no writes of zeroes to the main memory 112 takes place. As a result, initialization of a large page of memory may occur with a very small latency.

If a read from a memory location of a page corresponding to a chunk 206 that is in the unreserved and initialized state 306 is received by the chunk controller 116, as shown at 314, the chunk controller 116 may be configured to create and return a zero block (or some other expected initial value) corresponding to the size of the read to the processor core without an actual read from the data area 204 taking place. From the point of view of the processor cores, the OS, or the VMM of the computing system, the memory location exists and is allocated, and has a content of zero. However, only the chunk controller 116 that manages the P2CT 202 may be aware that the memory locations in the page are not actually reserved in the data area 204.

At a given time, a region of memory may be cleared by, for example, a calloc( ) call by the application program or through similar calls by the OS or VMM. The region of memory may include one or more chunks 206 that are in the unreserved and uninitialized state 304. The chunk controller 116 may be configured to change the status identifier 214 of these chunks 206 in the region as reflected in the corresponding entry(s) 208 in the P2CT 202 to reflect the unreserved and initialized state 306, as further shown at 316 in FIG. 3.

It will be appreciated that when a page of memory is allocated or initialized but mostly unused, for example due to a shared library only occupying a small portion of the page space, most of the chunks 206 making up the page as reflected by the entry 208 corresponding to the page in the P2CT 202 do not correspond to reserved space in the data area 204. Thus page fragmentation may be eliminated and any fragmentation in the main memory 112 will be chunk fragmentation. However, because the chunk size may be much smaller than the page size, such as a 4 KB chunk size versus a 4 MB page size, the amount of fragmentation in main memory 112 may be no greater than fragmentation that would occur with a small page size of 4 KB. Chunk size may be any size desirable for a given computing environment.

If the chunk controller 116 receives a write to an address in a page of memory affecting a chunk 206 indicated as in either the unreserved and uninitialized state 304 or the unreserved and initialized state 306 by the corresponding status identifier 214 in the P2CT 202, the chunk controller 116 may be configured to initiate a chunk write event, as shown at 318 and 320 in FIG. 3. This event may arise from a write back of a block evicted from the cache, for example. The chunk write event may involve locating and reserving a free chunk 206 in the data area 204, recording a pointer to the free chunk in the chunk pointer 212 for the chunk in the entry 208 in the P2CT 202 corresponding to the page of memory, zeroing the content of the chunk in the data area if the write originates when the chunk is indicated in the unreserved and initialized state 306, and performing the write at the address on the reserved free chunk 206. The chunk write event may also transition the state of the chunk 206 as indicated in the corresponding status identifier 214 to the reserved state 308, as further shown in FIG. 3. The chunk controller 116 may be configured to process any subsequent read or write to a chunk 206 indicated in the reserved state 308 against the chunk in the data area 204 based on the corresponding chunk pointer 212, while the corresponding status identifier 214 in the P2CT does not change state, as shown at 322.

If a page of memory is deallocated by the OS or VMM, as shown at 324, then the chunk controller 116 may be configured to change the status identifiers 214 in the pairs 210 of the corresponding entry 208 in the P2CT 202 to reflect the unallocated state 302. If a page of memory is reallocated, then the chunk controller 116 may be configured to change the status identifiers 214 in the corresponding entry 208 in the P2CT 202 to reflect the unreserved and uninitialized state 304, as shown at 326. If a page of memory is reallocated and reinitialized, then the chunk controller 116 may be configured to change the status identifiers 214 in the corresponding entry 208 in the P2CT 202 to reflect the unreserved and initialized state 306, as shown at 328. In addition to transitioning the status identifiers 214 in the P2CT 202 to the unallocated state 302, the unreserved and uninitialized state 304, or the unreserved and initialized state 306, the chunk controller 116 may also be configured to clear the corresponding chunk pointers 212 pointing to any reserved chunks 206 in the data area 204 and return the chunks to a free chunk list, as will be described below, thereby making the chunks available for future chunk reservation. Clearing the chunk pointers 212 may include setting the chunk pointers to null or zero values, for example.

According to some embodiments, the chunk controller 116 may provide an interface allowing the processor cores 104 to perform basic memory operations. For example, page management routines may be exposed by the chunk controller 116. These page management routines may come in the form of new processor instructions, such as ALLOC_PAGE, CLEAR_PAGE, ALLOC&CLEAR_PAGE, or other page management routines. Utilizing these instructions, the OS or VMM can allocate a page, initialize a page, or both using a single instruction. When the instructions are encountered, the chunk controller 116 may be informed of the operations and update the P2CT 202 accordingly. In some other embodiments, the page management routines may be exposed to the OS or VMM as device commands. Allocating or initializing a page of memory utilizing these page managements routines may take a significantly shorter time by eliminating the large quantity load/store instructions at the granularity of a word/double-word that are conventionally executed by the processor cores 104. Instead, these routines may be performed by the chunk controller 116, thereby freeing the processor cores 104 to execute other instructions.

In some further embodiments, the chunk controller 116 may be configured to expose a page copying routine to the processor cores, the OS, or the VMM through an additional processor instruction or device command. Implementing a page copy routine in the chunk controller 116 may significantly reduce latency of page copy operations. While the latency of copying a page of memory of a large page size may be high as it can involve the copying of all reserved chunks 206 in the data area 204, such an operation may still be more efficient than copying a large number of pages of small page size. In addition, by implementing the page copying routine in the chunk controller 116, the processor cores 104 may be relieved from the processing load of performing page copies, and may be available to execute other instructions or threads.

When the status of chunk 206 is changed from the unreserved and uninitialized state 304 or the unreserved and initialized state 306 to the reserved state 308, such as shown at 318 and 320 in FIG. 3 for example, the chunk controller 116 may also be configured to locate a free chunk 206 in the data area 204 of main memory 112 to reserve for the chunk. In order to support this operation, the chunk controller 116 may be configured to maintain a free chunk list of free chunks in the data area 204. When a chunk 206 needs to be reserved to a page of memory in the P2CT 202, a free chunk may be taken from this free chunk list and a pointer to the free chunk may be stored in the corresponding chunk pointer 212. When a page of memory is deallocated, reallocated, or reinitialized, the chunks 206 of the page may be added back to the free chunk list.

Figure 4:
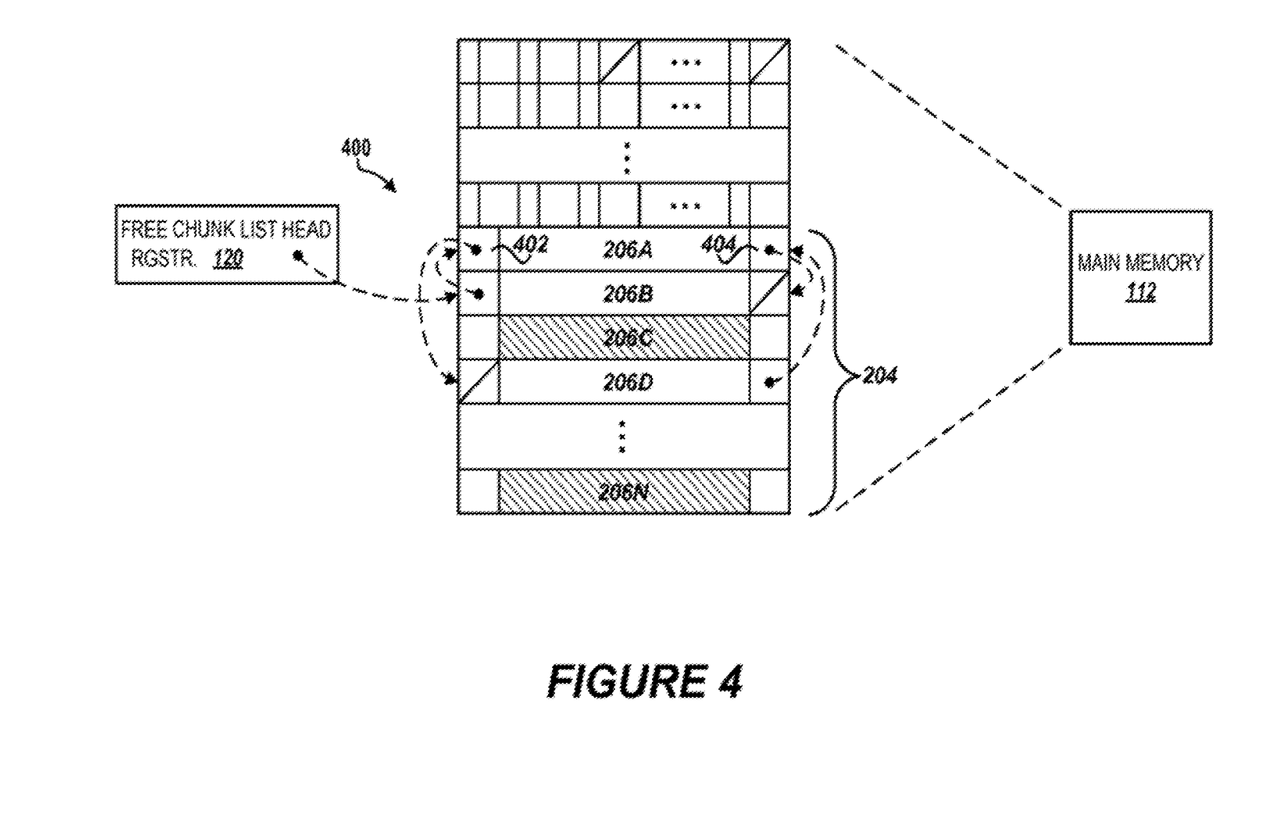
FIG. 4 is a functional block diagram showing an illustrative configuration of a free chunk list maintained in main memory.

FIG. 4 is a functional block diagram showing an illustrative configuration of a free chunk list 400 maintained in the main memory 112, arranged according to at least some embodiments presented herein. According to some embodiments, the free chunk list 400 may be maintained in the data area 204 by the chunk controller 116. In order to simplify the management of the free chunk list 400, the free chunk list 400 may be maintained by the chunk controller 116 in the chunks 206 themselves. The free chunk list 400 may be maintained as a linked list (e.g., a single-linked or doubly-linked list), with a head to the linked list maintained in a free chunk list head register 120 of the chunk controller 116, as described above in regard to FIG. 1. For example, as shown in FIG. 4, chunks 206A, 206B, and 206D may be free (as indicated by a lack of cross-hatching), while the remaining chunks of the data area 204 may be reserved (as indicated by a presence of cross-hatching). With a doubly-linked list, each chunk 206 in the data area 204 may include two pointers, a next free chunk pointer 402 and a previous free chunk pointer 404.

The free chunk list head register 120 may be configured to point to the first free chunk in the free chunk list 400, such as chunk 206B. The previous free chunk pointer 404 of the first free chunk 206B may be null, while the next free chunk pointer 402 may point to the next free chunk in the free chunk list 400, such as chunk 206A. The previous free chunk pointer 404 of chunk 206A may point to chunk 206B, while the next free chunk pointer 402 may point to the next free chunk in the free chunk list 400, such as chunk 206D, and so on. The next free chunk pointer 402 of the last free chunk 206D in the free chunk list 400 may be null. When the chunk controller 116 needs to locate and reserve a free chunk 206 from the data area 204, the chunk controller 116 may be configured to locate and reserve the free chunk pointed to by the free chunk list head register 120. In particular, the chunk controller 116 may be configured to remove the chunk from the free chunk list 400 through simple pointer manipulation. For example, the free chunk list head register 120 may be changed to point to the next free chunk in the free chunk list 400 as identified by the removed chunk. Similarly, when a chunk is 206 is freed, the chunk controller 116 may be configured to add the chunk to the head of the free chunk list 400 through simple pointer manipulation. For example, the next free chunk pointer of the new chunk may point to the first free chunk in the free chunk list 400, while the previous free chunk pointer of the first free chunk may point to the new chunk.

As described briefly above with reference to FIG. 2, the P2CT 202 may have as many entries 208 as the number of pages of memory that would fit in the data area 204 of the main memory 112 based on the selected page size. However, it will be appreciated that some of the chunks 206 including a page or memory in P2CT may never be reserved or accessed. This may lead to a condition where the main memory 112 is underused. In this case, the chunk controller 116 may over-represent the number of pages of memory available in the main memory 112 to the OS or VMM, based on a utilization of the chunks 206 corresponding to the pages as determined from the P2CT 202. For example, if on average only half of all chunks 206 represented in the P2CT 202 are actually reserved in the data area 204, then the chunk controller 116 may be configured to represent essentially double the number of entries 208 in the P2CT 202 in order to utilize the entire main memory 112. In this way, the main memory 112 may perform similarly to a hypothetical memory twice the size of the data area 204. In some other embodiments, the chunk controller 116 may be configured to make available the unreserved chunks 206 in the data area 204 of the main memory 112 to other computing devices, or "nodes," in a data center so that the other nodes can utilize the excess memory to store other data, such as a swap file or a part of a file system, for example.

It will be further appreciated that the implementation of the main memory configuration 200 shown in FIG. 2 and described above only adds one additional indirection to a memory lookup. For example, in a typical 64-bit computing device, a memory lookup may already have four indirections without virtualization support due to at least four levels in the page table. With virtualization support, the same system may have as many as twenty-four indirections due to the nested page tables. Utilizing the technologies described herein allows for the benefits of a large page size to be realized while adding only one additional indirection to existing memory lookups. In addition, the chunk controller 116 may be configured to implement a small P2CT cache 122, as described above with reference to FIG. 1, to reduce the latency of the additional indirection.

Figure 5:
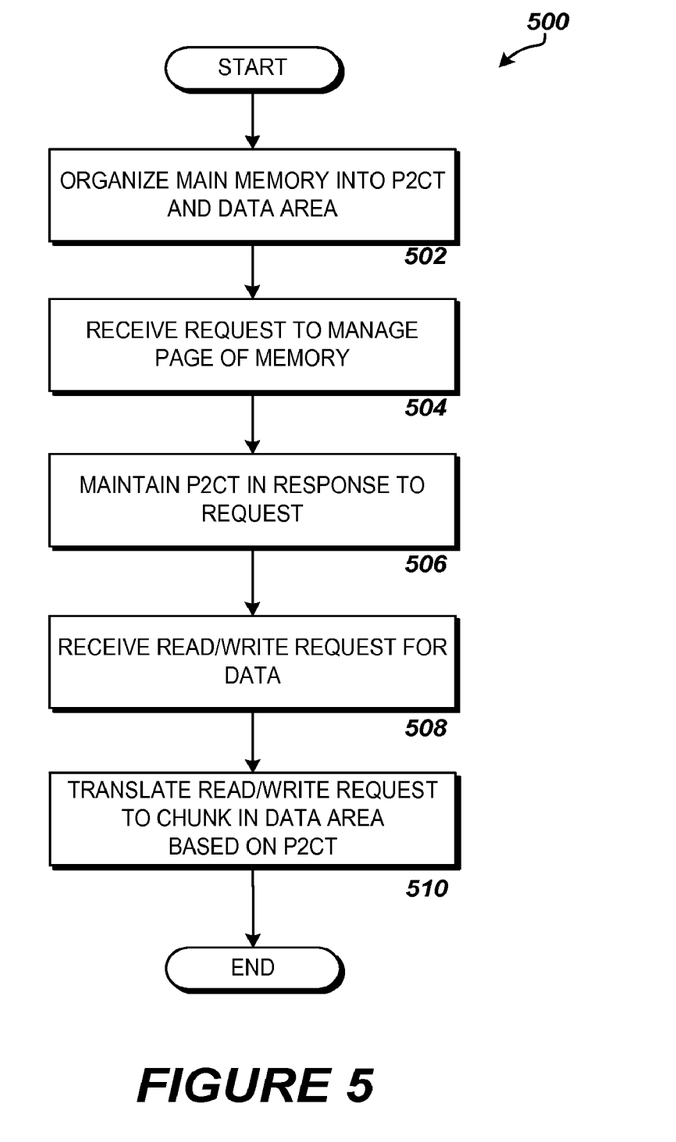
FIG. 5 is a flow diagram illustrating an example process for handling a large page size in a computing system.

FIG. 5 is a flow diagram illustrating an example process 500 for handling a large page size in a computing system, arranged according to at least some embodiments presented herein. The process 500 may include various operations, functions, or actions as illustrated by one or more blocks 502-510.

The process 500 may begin at block 502 (Organize Main Memory into P2CT and Data Area), wherein the chunk controller 116 may be configured to initially organize the main memory 112 (all, a substantial portion, or only some portion of the main memory) to include a P2CT 202 and a data area 204, as described above in regard to FIG. 2. Block 502 may be followed by block 504.

At block 504 (Receive Request to Manage Page of Memory), the chunk controller 116 may be configured to receive a request from the OS, the VMM, and/or the processor cores 104 to manage a physical page of memory. The page management request may include a request to allocate a page of memory in the main memory 112, with or without clearing or initializing the page. The page management request may further include a request to deallocate, reallocate, or reinitialize a page of memory. Block 504 may be followed by block 506.

At block 506 (Maintain P2CT in Response to Request), the chunk controller 116 may be configured to maintain the entry 208 in the P2CT 202 corresponding to the page of memory targeted by the page management request received at block 504. For example, the chunk controller 116 may transition the status identifiers 214 in the pairs 210 corresponding to the chunks 206 contained in the page of memory as detailed above in the state diagram of FIG. 3. In the case of a deallocate request, for example, the chunk controller 116 may further be configured to add the reserved chunks 206 contained in the page of memory based on the P2CT 202 back to the free chunk list 400, as described above in regard to FIG. 4. Block 506 may be followed by block 508.

At block 508 (Receive Read/Write Request for Data), the chunk controller 116 may be configured to receive a read request or write request affecting one or more chunks 206 contained in the page of memory as indicated in the P2CT or reserved in the data area 204. Block 508 may be followed by block 510.

At block 510 (Translate Read/Write Request to Chunk in Data Area Based on P2CT), the chunk controller 116 may be configured to translate the read or write request to address the affected chunk(s) 206 in the data area 204 based on the chunk pointers 212 maintained in the entry 208 in the P2CT 202 corresponding to the page of memory targeted by the read or write request. The chunk controller 116 may further be configured to maintain the entry 208 in the P2CT 202 corresponding to the page of memory targeted by the read or write request received at block 508. For example, the chunk controller 116 may be configured to locate the next free chunk in the free chunk list 400, remove the chunk from the free chunk list 400, reserve the chunk 206 in the data area 204 for the targeted page of memory by updating the corresponding chunk pointer 212 in the P2CT, and update the corresponding status identifier 214 for the chunk to indicate the reserved state 308, as described above with reference to FIGS. 2 and 4. From block 510, the process 500 may repeat (e.g., periodically, continuously, or on-demand) or terminate.

Figure 6:
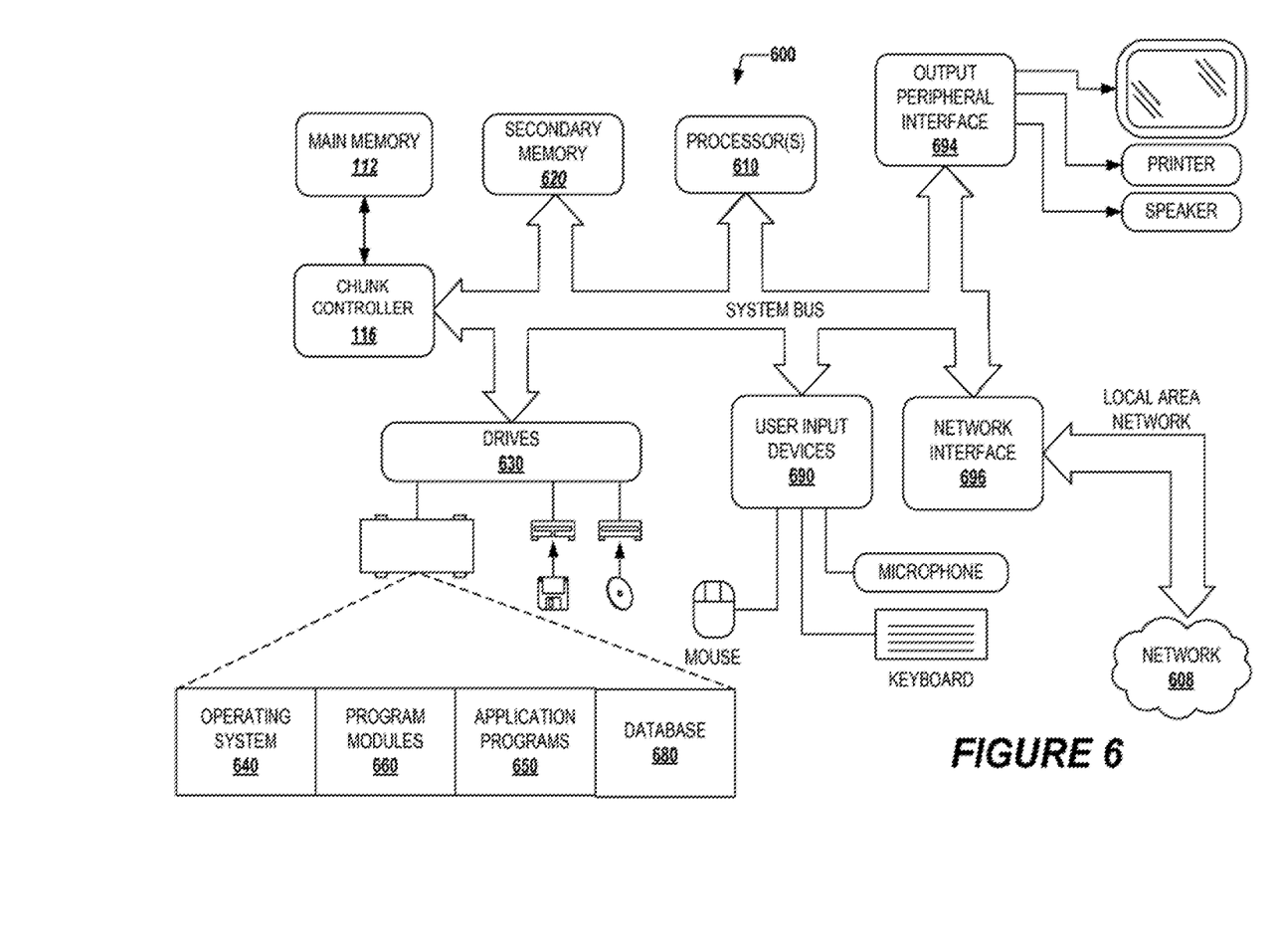
FIG. 6 is a block diagram illustrating a computer hardware architecture for an example computing system.

FIG. 6 is a block diagram illustrating a computer hardware architecture for an example computing device arranged according to at least some embodiments presented herein. The computer 600 may be implemented as a conventional computer system, an embedded control computer, a laptop computer, a server computer, a mobile device, a set-top box, a kiosk, a vehicular information system, a mobile telephone, a customized machine, or other hardware platform. As depicted, a computer 600 includes one or more processors 610 and a main memory 112. The processors 610 may be embodied on one or more multicore chips 102, as described above with reference to FIG. 1. According to some embodiments, one or more of the processors 610 may be configured to manage, at least in part, the memory space of the main memory 112 as described above. The main memory 112 may be configured as described above with reference to FIG. 2. In this respect, the main memory 112 may contain the P2CT 202 and the data area 204, which can be controlled by the chunk controller 116. The computer 600 may further include other memories beyond the main memory 112, such as a secondary memory 620.

The computer 600 may include one or more drives 630. The drives 630 and their associated computer storage media, provide storage of computer-readable instructions, data structures, program modules and other data for the computer 600. The drives 630 can include an operating system 640, application programs 650, program modules 660, and a database 680. According to some embodiments, the operating system 640 may be configured to manage, at least in part, the memory space of the main memory 112 as described above. The computer 600 further includes user input devices 690 through which a user may enter commands and data. The user input devices 690 can include one or more of an electronic digitizer, a microphone, a keyboard and pointing device, commonly referred to as a mouse, trackball or touch pad. Other input devices may include a joystick, game pad, satellite dish, scanner, other devices, or the like.

These and other input devices can be coupled to the processor 610 through a user input interface that is coupled to a system bus, but may be coupled by other interface and bus structures, such as a parallel port, game port or a universal serial bus ("USB"). Computers such as the computer 600 may also include other peripheral output devices such as speakers, printers, displays, and/or other devices, which may be coupled through an output peripheral interface 694 or the like.

The computer 600 may operate in a networked environment using logical connections to one or more computers, such as a remote computer (not illustrated) and/or other devices operating as part of or in communication with a network 608 coupled to a network interface 696. The remote computer may be a personal computer, a server computer, a router, a network PC, a peer device or other common network node, and can include many or all of the elements described above relative to the computer 600. Networking environments are commonplace in offices, enterprise-wide area networks ("WAN"), local area networks ("LAN"), intranets, and the Internet.

When used in a LAN or WLAN networking environment, the computer 600 may be coupled to the LAN through the network interface 696 or an adapter. When used in a WAN networking environment, the computer 600 typically includes a modem or other means for establishing communications over the WAN, such as the Internet or the network 608. The WAN may include the Internet, the illustrated network 608, various other networks, or any combination thereof. It will be appreciated that other mechanisms of establishing a communications link, ring, mesh, bus, cloud, or network between the computers may be used.

According to some embodiments, the computer 600 may be coupled to a networking environment. The computer 600 may include one or more instances of a physical computer-readable storage medium or media associated with the drives 630 or other storage devices. The system bus may enable the processors 610 to read code and/or data to/from the computer storage media. The media may represent an apparatus in the form of storage elements that are implemented using any suitable technology including, but not limited to, semiconductors, magnetic materials, optical media, electrical storage, electrochemical storage, or any other such storage technology. The media may represent components associated with the main memory 112 or secondary memory 620, whether characterized as RAM, ROM, flash, or other types of volatile or nonvolatile memory technology. The media may also represent secondary storage, whether implemented as the storage drives 630 or otherwise. Hard drive implementations may be characterized as solid state, or may include rotating media storing magnetically-encoded information.

The storage media may include one or more program modules 660. The program modules 660 may include software instructions that, when loaded into the processor 610 and executed, transform a general-purpose computing system into a special-purpose computing system. As detailed throughout this description, the program modules 660 may provide various tools or techniques by which the computer 600 may participate within the overall systems or operating environments using the components, logic flows, and/or data structures discussed herein.

The processors 610 may be constructed from any number of transistors or other circuit elements, which may individually or collectively assume any number of states. More specifically, the processor 610 may operate as a state machine or finite-state machine Such a machine may be transformed to a second machine, or specific machine by loading executable instructions contained within the program modules 660. These computer-executable instructions may transform the processor 610 by specifying how the processor 610 transitions between states, thereby transforming the transistors or other circuit elements constituting the processor 610 from a first machine to a second machine. The states of either machine may also be transformed by receiving input from the one or more user input devices 690, the network interface 696, other peripherals, other interfaces, or one or more users or other actors. Either machine may also transform states, or various physical characteristics of various output devices such as printers, speakers, video displays, or otherwise.

Encoding the program modules 660 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, or the like. For example, if the storage media are implemented as semiconductor-based memory, the program modules 660 may transform the physical state of the semiconductor memory when the software is encoded therein. For example, the software may transform the state of transistors, capacitors, or other discrete circuit elements constituting the semiconductor memory.

As another example, the storage media may be implemented using magnetic or optical technology such as drives 630. In such implementations, the program modules 660 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description. As used in the claims, the phrase "computer storage medium," and variations thereof, does not include waves, signals, and/or other transitory and/or intangible communication media, per se.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-core processor systems, microprocessor-based or programmable consumer electronics, minicomputers, mainframe computers, or the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, compounds, or compositions, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," or the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A memory configuration, comprising:
    a memory comprising a page-to-chunk table and a data area, wherein the page-to-chunk table comprises a plurality of entries including a first entry, the first entry corresponding to a page comprising a plurality of chunks stored in the data area, the first entry comprising pointers to the plurality of chunks stored in the data area, and the first entry comprising at least a first status identifier and a first pointer; and
    a chunk controller configured to:
        manage translation of the page to the plurality of chunks using the page-to-chunk table,
        determine whether a chunk from the plurality of chunks is unreserved in the data area and whether the chunk has zero content based on a response to a request for allocation of the page, wherein:
            the chunk is unreserved in the data area, if responsive to the request, one of: the page is allocated without clearing data of the page, and the page is allocated and cleared by writing zero content to all the plurality of chunks in the page, and
            the chunk has zero content, if responsive to the request, the page is allocated and cleared by writing zero content to all the plurality of chunks in the page;
        use the first status identifier to indicate whether the chunk from the plurality of chunks is reserved in the data area and whether the chunk has zero content, and
        reduce a fragmentation of the memory by:
            prevention of allocation of the memory to the chunk in the data area in response to the chunk being unreserved in the data area, and
            further prevention of allocation of the memory to the page in response to each chunk of the plurality of chunks, including the chunk, having zero content.

2. The memory configuration of claim 1, wherein the first status identifier is configured to transition amongst an unallocated state, an unreserved and uninitialized state, an unreserved and initialized state, and a reserved state.

3. The memory configuration of claim 2, wherein when the first status identifier transitions to the reserved state, the chunk controller is further configured to reserve a first chunk in the data area and to modify the first pointer to point to the first chunk.

4. The memory configuration of claim 3, wherein when the first status identifier transitions from the reserved state to the unallocated state, the unreserved and uninitialized state, or the unreserved and initialized state, the chunk controller is further configured to free the first chunk and to clear the first pointer.

5. The memory configuration of claim 4, wherein to free the first chunk, the chunk controller is configured to add the first chunk to a free chunk list.

6. The memory configuration of claim 3, wherein to reserve the first chunk in the data area, the chunk controller is configured to retrieve a current free chunk from a free chunk list.

7. The memory configuration of claim 6, wherein:
    the free chunk list comprises a linked list; and
    to retrieve the current free chunk from the free chunk list, the chunk controller is configured to retrieve a head pointer that points to the current free chunk in the free chunk list and to retrieve the current free chunk as indicated by the head pointer.

8. The memory configuration of claim 7, wherein the head pointer is stored in a dedicated register on the chunk controller.

9. The memory configuration of claim 7, wherein when the free chunk is retrieved from the free chunk list, the chunk controller is further configured to modify the head pointer to point to a next free chunk as indicated by the linked list.

10. The memory configuration of claim 1, wherein the chunk controller is further configured to set the first status identifier to an unallocated state when the memory initializes during a system boot, and wherein the unallocated state indicates that the page is unallocated; and wherein a first chunk of the plurality of chunks is unreserved in the data area when the first status identifier is in the unallocated state.

11. The memory configuration of claim 10, wherein the chunk controller is further configured to transition the first status identifier from the unallocated state to an unreserved and initialized state when the page is allocated with clearing of data in the page, and wherein the first chunk is unreserved in the data area when the first status identifier is in the unreserved and initialized state.

12. The memory configuration of claim 11, wherein the chunk controller is further configured to return a zero value when a chunk read is performed on the first chunk when the first status identifier is in the unreserved and initialized state.

13. The memory configuration of claim 10, wherein the chunk controller is further configured to transition the first status identifier from the unallocated state to an unreserved and uninitialized state when the page is allocated with no clearing of data in the page, and wherein the first chunk is unreserved in the data area when the first status identifier is in the unreserved and uninitialized state.

14. The memory configuration of claim 13, wherein the chunk controller is further configured to transition the first status identifier from the unreserved and uninitialized state to an unreserved and initialized state when a chunk clear is performed on the page to clear the data in the page, and wherein the first chunk is unreserved in the data area when the first status identifier is in the unreserved and initialized state.

15. The memory configuration of claim 1, wherein the chunk controller is configured to set the first status identifier to a reserved state when a chunk write is performed on a first chunk of the plurality of chunks, and wherein the first chunk is reserved in the data area when the first status identifier is in the reserved state.

16. The memory configuration of claim 15, wherein the chunk controller is configured to transition the first status identifier from the reserved state to an unallocated state when the page is de-allocated, and wherein the first chunk is freed when the first status identifier is transitioned to the unallocated state.

17. The memory configuration of claim 15, wherein the chunk controller is configured to transition the first status identifier from the reserved state to an unreserved and uninitialized state when the page is reallocated with no clearing of data in the page, and wherein the first chunk is freed when the first status identifier is transitioned to the unreserved and uninitialized state.

18. The memory configuration of claim 15, wherein the chunk controller is configured to transition the first status identifier from the reserved state to an unreserved and initialized state when the page is reallocated with clearing of data in the page, and wherein the first chunk is freed when the first status identifier is transitioned to the unreserved and initialized state.

19. The memory configuration of claim 15, wherein the chunk controller is configured to maintain the first status identifier in the reserved state when a chunk read is performed on the first chunk.

20. The memory configuration of claim 1, wherein the chunk controller comprises a page-to-chunk cache memory configured to store a subset of the plurality of entries.

21. The memory configuration of claim 1, wherein a total chunk size of the plurality of chunks equals a page size of the page.

22. The memory configuration of claim 1, wherein a chunk size of each of the plurality of chunks is about four kilobytes, and wherein a page size of the page is at least one megabyte.

23. A method to handle large pages in a memory, the memory comprising a page-to-chunk table and a data area, the page-to-chunk table comprising a plurality of entries including a first entry corresponding to a page, the page comprising a plurality of chunks stored in the data area and including a first chunk, and the first entry comprising a first status identifier for the first chunk and a first pointer, the method comprising:
 setting, the first status identifier for the first chunk to an unallocated state, wherein the unallocated state indicates that the page is unallocated;
 receiving a request for page allocation;
 if data in the page is not cleared in response to receipt of the request for page allocation, transitioning the first status identifier from the unallocated state to an unreserved and uninitialized state, wherein the first chunk is unreserved in the data area when the first status identifier is in the unreserved and uninitialized state; and
 if the data in the page is cleared by writing zero content to all the plurality of chunks in the page in response to receipt of the request for page allocation, transitioning the first status identifier from the unreserved and uninitialized state to an unreserved and initialized state, wherein the first chunk is unreserved in the data area and has zero content when the first status identifier is in the unreserved and initialized state;
 reducing a fragmentation of the memory by:
  preventing allocation of the memory to the first chunk in the data area in response to the first chunk being unreserved in the data area, and
  further preventing allocation of the memory to the page in response to each chunk of the plurality of chunks, including the first chunk, having zero content.

24. The method of claim 23, further comprising:
 after transitioning the first status identifier to the unreserved and uninitialized state, receiving a request to clear the data in the page; and
 in response to receipt of the request to clear the data in the page, transitioning the first status identifier from the unreserved and uninitialized state to the unreserved and initialized state.

25. The method of claim 23, further comprising:
 after transitioning the first status identifier to the unreserved and initialized state, receiving a request to perform a chunk read on the first chunk; and
 in response to receipt of the request to perform the chunk read on the first chunk, returning a zero value and maintaining the first status identifier in the unreserved and initialized state.

26. The method of claim 23, further comprising:
 after transitioning the first status identifier to either the unreserved and uninitialized state or the unreserved and initialized state, receiving a request to perform a chunk write on the first chunk; and
 in response to receipt of the request to perform the chunk write on the first chunk, reserving the first chunk in the data area, clearing the chunk to zeros if the first status identifier was in an unreserved and initialized state, performing the chunk write on the first chunk, modifying the first pointer to point to the first chunk, and transitioning the first status identifier from either the unreserved and uninitialized state or the unreserved and initialized state to a reserved state.

27. The method of claim 26, further comprising:
after transitioning the first status identifier to the reserved state, receiving a request to perform an additional chunk write on the first chunk; and
in response to receipt of the request to perform the additional chunk write on the first chunk, performing the additional chunk write on the first chunk, maintaining the first status identifier in the reserved state, and maintaining the first pointer to the first chunk.

28. The method of claim 26, further comprising:
after transitioning the first status identifier to the reserved state, receiving a request to de-allocate the page; and
in response to receipt of the request to de-allocate the page, freeing the first chunk in the data area, clearing the first pointer, and transitioning the first status identifier from the reserved state to the unallocated state.

29. The method of claim 26, further comprising:
after transitioning the first status identifier to the reserved state, receiving a request to reallocate the page with no clearing of the data in the page; and
in response to receipt of the request to reallocate the page with no clearing of the data in the page, freeing the first chunk in the data area clearing the first pointer, and transitioning the first status identifier from the reserved state to the unreserved and uninitialized state.

30. The method of claim 26, further comprising:
after transitioning the first status identifier to the reserved state, receiving a request to reallocate the page with clearing of the data in the page; and
in response to receipt of the request to reallocate the page with clearing of the data in the page, freeing the first chunk in the data area, clearing the first pointer, and transitioning the first status identifier from the reserved state to the unreserved and initialized state.

31. The method of claim 26, further comprising:
after transitioning the first status identifier to the reserved state, receiving a request to perform a chunk read on the first chunk; and
in response to receipt of the request to perform the chunk read on the first chunk, performing the chunk read on the first chunk, maintaining the first status identifier in the reserved state, and maintaining the first pointer to the first chunk.

32. A system, comprising:
a plurality of processor cores comprising a plurality of cache memories;
a main memory coupled to the plurality of processor cores and comprising a page-to-chunk table and a data area, wherein the page-to-chunk table comprises a plurality of entries including a first entry, the first entry corresponding to a page comprising a plurality of chunks stored in the data area, the first entry comprising pointers to the plurality of chunks stored in the data area, and the first entry comprising at least a first status identifier and a first pointer; and
a chunk controller coupled to the plurality of processor cores and to the main memory, wherein the chunk controller is configured to:
receive requests from the plurality of processor cores to access the page in the main memory,
manage translation of the page to the plurality of chunks using the page-to-chunk table in response to the requests,
determine whether a chunk from the plurality of chunks is unreserved in the data area and whether the chunk has zero content based on a response to a request for allocation of the page, wherein:
the chunk is unreserved in the data area, if responsive to the request, one of: the page is allocated without clearing data of the page, and the page is allocated and cleared by writing zero content to all the plurality of chunks in the page, and
the chunk has zero content, if responsive to the request, the page is allocated and cleared by writing zero content to all the plurality of chunks in the page;
use the first status identifier to indicate whether a chunk from the plurality of chunks is reserved in the data area and whether the chunk has zero content, and
reduce a fragmentation of the main memory by:
prevention of allocation of the main memory to the chunk in the data area in response to the chunk being unreserved in the data area, and
further prevention of allocation of the main memory to the page in response to each chunk of the plurality of chunks, including the chunk, having zero content.

33. The system of claim 32, wherein the page-to-chunk table is invisible to an operating system (OS), and wherein the data area is visible to the OS.

* * * * *

UNITED STATES PATENT AND TRADEMARK OFFICE
CERTIFICATE OF CORRECTION

PATENT NO. : 9,552,295 B2  Page 1 of 1
APPLICATION NO. : 13/880194
DATED : January 24, 2017
INVENTOR(S) : Solihin It is certified that error appears in the above-identified patent and that said Letters Patent is hereby corrected as shown below:

In the Specification

Column 1, Line 8, delete "§371" and insert -- § 371 --, therefor.

Column 13, Line 29, delete "machine" and insert -- machine. --, therefor.

In the Claims

Column 16, Line 40, Claim 4, delete "dear" and insert -- clear --, therefor.

Column 18, Line 13, Claim 23, delete "setting," and insert -- setting --, therefor.

Signed and Sealed this
Fourth Day of April, 2017

Michelle K. Lee
*Director of the United States Patent and Trademark Office*